US006922478B1

(12) United States Patent
Konen et al.

(10) Patent No.: US 6,922,478 B1
(45) Date of Patent: Jul. 26, 2005

(54) METHOD FOR VERIFYING THE AUTHENTICITY OF AN IMAGE RECORDED IN A PERSON IDENTIFYING PROCESS

(75) Inventors: Wolfgang Konen, Bochum (DE); Michael Brauckmann, Witten (DE); Andre Liebetrau, Nordhausen (DE)

(73) Assignee: ZN Vision Technologies AG, Bochum (DE)

( * ) Notice: Subject to any disclaimer, the term of this patent is extended or adjusted under 35 U.S.C. 154(b) by 0 days.

(21) Appl. No.: 09/623,985

(22) PCT Filed: Mar. 11, 1999

(86) PCT No.: PCT/EP99/01600

§ 371 (c)(1),
(2), (4) Date: Apr. 17, 2001

(87) PCT Pub. No.: WO99/46737

PCT Pub. Date: Sep. 16, 1999

(30) Foreign Application Priority Data

Mar. 12, 1998 (DE) ......................................... 198 10 792

(51) Int. Cl.[7] ................................................. G06K 9/00
(52) U.S. Cl. ..................................................... 382/115
(58) Field of Search ................................ 382/107, 172, 382/272, 170, 171, 115, 116, 117, 118; 340/5.53; 713/168, 169, 170, 182, 186; 705/18; 902/5, 6; 399/80; 348/156

(56) References Cited

U.S. PATENT DOCUMENTS

| | | | | |
|---|---|---|---|---|
| 4,843,377 A | * | 6/1989 | Fuller et al. | 340/573.4 |
| 4,942,464 A | | 7/1990 | Milatz | |
| 5,150,432 A | * | 9/1992 | Ueno et al. | 382/56 |
| 5,161,018 A | * | 11/1992 | Matsunaga | 358/167 |
| 5,410,609 A | * | 4/1995 | Kado et al. | 382/2 |
| 5,570,434 A | | 10/1996 | Badique | |
| 5,625,704 A | | 4/1997 | Prasad | |
| 5,719,951 A | | 2/1998 | Shackleton et al. | |
| 5,761,329 A | * | 6/1998 | Chen et al. | 382/116 |
| 6,101,264 A | | 8/2000 | Wagner et al. | |
| 6,181,805 B1 | * | 1/2001 | Koike et al. | 382/118 |
| 6,353,632 B1 | * | 3/2002 | Moeller et al. | 375/240.01 |
| 6,421,453 B1 | * | 7/2002 | Kanevsky et al. | 382/115 |
| 6,678,393 B1 | * | 1/2004 | Dunton et al. | 382/103 |

FOREIGN PATENT DOCUMENTS

| | | |
|---|---|---|
| DE | 3633360 | 4/1988 |
| DE | 4406020 | 6/1995 |
| DE | 19610066 | 9/1997 |
| DE | 19641000 | 4/1998 |
| EP | 0 582 989 | 2/1994 |
| WO | WO95/26013 | 9/1995 |

OTHER PUBLICATIONS

Russ, J.C., "The Image Processing Handbook." Second Edition. Boca Raton: CRC Press. 1995. pp. 216–220.*
TEST; Geld Nurmit 'Richtigem Gesicht'; *VonChristoph Meyer; Munchner Merkur*; No. 63; Mar. 17, 1998.
Biometric Recognition: Photonics Ushers in a New Age of Security; R. Winn Hardin; *Photonics Spectra*; Nov. 1997; pp. 88–100.
Human and Machine Recognition of Faces: A Survey; *Rama Chellappa, et al.; Proceedings of the IEEE*; May 1995; vol. 83, No. 5; pp. 705–741.

* cited by examiner

*Primary Examiner*—Andrew W. Johns
*Assistant Examiner*—Shervin Nakhjavan
(74) *Attorney, Agent, or Firm*—IP Strategies

(57) ABSTRACT

The present invention relates to a method for verifying the authenticity of an image recorded in a person identifying process and belonging to a person to be identified, the method comprising the steps of recording a sequence of consecutive individual images of the person and determining the authenticity of the recorded image if at least in two consecutive individual images of the sequence intrinsic movements are detected, i.e. movements which are carried out by the person to be identified consciously or unconsciously and without changes in his or her center of gravity.

55 Claims, 9 Drawing Sheets

METHOD FOR VERIFYING THE AUTHENTICITY OF AN IMAGE RECORDED IN A PERSON IDENTIFYING PROCESS

FIELD OF THE INVENTION

The present invention relates to a method for verifying the authenticity of an image recorded in a person identifying process and belonging to a person to be identified.

BACKGROUND OF THE INVENTION

Known person-identifying methods which are e.g. based on face recognition as described in German patent 44 06 020 only compare single photographs of the person to be identified with reference pictures. Thus only static information is processed in said methods. Such methods have the drawback that an access control operating with such a method can easily be deceived by showing a photo or a mask-like picture of the person.

Therefore, various methods have been developed for reducing the risk of such deceptions.

For instance, it is known from German Utility Model 2 950 660 that the spectral range of the light used for identifying a person is limited by an IR filter disc to a range in which a photo or a mask-like picture has reflectance characteristics which differ from those of an actually recorded face. Such an IR filter disc has the drawback that the image quality is reduced thereby and that the demands made on the quality of the identifying process increase. On the other hand, there is the risk that an image medium is found with reflectance characteristics in the IR range that are similar to the reflectance characteristics of a person's face in the IR range, whereby a deception is again possible with such an image medium.

Furthermore, the prior art discloses methods in which the picture of the person to be identified is taken with a stereo imaging system. For instance, such a method is used in the face recognizing system described in the article "In-Your-Face Security" in PCWeek of Mar. 26, 1997. Other methods for detecting the three-dimensional structure of a face either fully or in part are laser triangulation or the so-called shape-from-shading methods disclosed by Attick, Griffin and Redlich in Neural Computation 8, 1321–1340, 1996; these make it possible to draw conclusions from the gray-level curve at a given direction of illumination with respect to the depth information of the object viewed. Although deceptions in the case of which an image is held in planar fashion in front of the recording system can be detected with such methods, deceptions with a cylindrically bent image or a three-dimensional mask cannot be recognized as such.

Moreover, the prior art discloses methods in which the pictures of the person to be identified are taken by means of thermographic methods; see e.g. German patent 4 009 051. In this instance, the radiant heat emitted by the person to be identified is detected and compared with a given reference value for identifying the person. This method, however, has the drawback that the devices for carrying out the methods are very expensive, in particular the thermographic camera used for image-recording the person to be identified. Thus thermographic methods cannot be used in access controls which are to be used in many places, e.g. in cash dispensers for withdrawing money and/or in banking transactions.

BRIEF SUMMARY OF THE INVENTION

In view of the above-discussed drawbacks of the devices known from the prior art, it is the object of the present invention to provide a method for verifying the authenticity of an image recorded in a person identifying process and belonging to a person to be identified, in the case of which the reliability during verification of the authenticity is improved over the prior art on the one hand and thus the security to be achieved with an access control, and which can be implemented at low costs on the other hand.

This object is achieved by a method for verifying the authenticity of an image recorded in a person identifying process and belonging to a person to be identified, the method comprising the steps of recording a sequence of consecutive individual images of the person and of determining the authenticity of the recorded image if in at least two consecutive individual images of the sequence intrinsic movements of the person are detected.

Since in the method of the invention intrinsic movements of a person to be identified, i.e. movements carried out by every person, i.e. also a person to be identified, consciously or unconsciously and without changes in his or her center of gravity are used for verifying the authenticity of the recorded images, the authenticity will only be detected if the consecutively recorded individual images actually originate from a person performing intrinsic movements, i.e. from a living person. Thus a deception of an access control using the method of the invention is no longer possible by showing a cylindrically bent photo or a mask-like picture of the person to be identified, which considerably enhances the security guaranteed by the access control.

Furthermore, the method according to the invention can be implemented at relative low costs because only an image recording means (called recording means in the following) and an image evaluating means are required for carrying out the method and because said two means for carrying out the image recognition proper are already provided for. Consequently, the method of the invention for verifying the authenticity of a recorded image is also suited for use in access controls which are to be used in many places, e.g. in cash dispensers for withdrawing money and/or banking transactions.

According to a preferred development of the inventive method at least one differential image of two consecutive individual images of the sequence can be evaluated for determining the intrinsic movements.

The amount of data to be processed in the method of the invention can considerably be reduced by the formation of such differential images, whereby the method can be carried out at a faster pace. This has, inter alia, the effect that the demands made on the hardware for performing the method can be reduced, whereby the total costs of the system are immediately decreased.

Furthermore, according to a preferred variant a differential image which results from an AND operation of two consecutive differential images can be evaluated for determining the intrinsic movements.

Such a development yields, in particular, a differential image in which changes are considerably reduced that follow e.g. from a release of a dominating background in two consecutive individual images and are thus reflected in the differential image of two consecutive individual images. In other words, the differential image to be assessed in the final analysis is freed by this variant from changes that do not result from intrinsic movements.

According to another preferred development each differential image can be binarized prior to evaluation.

This measure, in turn, greatly reduces the amount of data to be processed, resulting in an increase in the speed of the method and thus in smaller demands on the hardware having the same efficiency.

Binarization may e.g. be carried out by means of a threshold value which is determined by evaluating the background of one of the differential images, e.g. by averaging the intensities of those pixels in the differential image that are in the area of the static background. This has the advantage that binarization is always determined in dependence upon the instantaneously existing image-recording situation. Thus the method can be adapted to environment-induced changes, for instance to changing light and/or contrast conditions, thanks to such a development.

Furthermore, at least one section of enhanced movement can be selected in each differential image, and it is possible to detect intrinsic movements if said at least one section in the differential image is consistent with a predetermined region in which intrinsic movements are to be expected.

Thanks to such a development of the method of the invention, the amount of data to be processed can be reduced again, which results in the already above-discussed advantages.

To this end, according to a first alternative, the section of enhanced movement can be defined by a vertical and a horizontal extent, the vertical extent being substantially determined by a peak of the function of the products from the horizontal projections with the horizontal variances of the differential image, and the horizontal extent being substantially determined by a peak of the function of the products from the vertical projections with the vertical variances of the differential image.

Advantageously, each function can be smoothed with a low-pass filter prior to the determination of the corresponding peak. This measure helps to avoid high-frequency noise in the differential images, which might lead to an impaired determination of the peak and thus of the section of enhanced movement. On the whole, this yields a more robust determination of the section of enhanced movement.

According to a further development of the first alternative, sections can be chosen from the differential image that are supposed to be in symmetrical relationship with one another, and intrinsic movements can be detected when the symmetrical relationship is verified by a correlation analysis of the corresponding sections. Since intrinsic movements, e.g. in the face of a person to be identified, are symmetrical as a rule, such a design helps to check whether the intrinsic movement detected in a specific region is actually an intrinsic one or just a different movement, e.g. noise or the like.

Moreover, independently of or together with said check, a further check can be carried out as to whether the enhanced movement in the region of enhanced movement is irregularly distributed over said region.

It can thereby be ruled out that small changes which might add up under adverse conditions are wrongly detected in their sum as an intrinsic movement.

According to a second alternative, a function which depends on the vertical position and which is determined for a given vertical position through the product of the horizontal projection with the horizontal variance of the differential image, and a function which depends on the horizontal position and which is determined for a given horizontal position through the product from the vertical projection with the vertical variance of the differential image can also be evaluated for detecting intrinsic movements.

Preferably, in the second alternative, it is also possible to smooth each function with a low-pass filter prior to the determination of the corresponding peak so as to filter high-frequency noise out of the differential images.

According to an advantageous development, it is possible for the evaluation of the above-mentioned functions to determine at least one peak in the function depending on the vertical position, and at least one peak in the function depending on the horizontal position, and finally intrinsic movements can be detected if said peaks are within predetermined limits in the vertical and horizontal direction, said limits being defined by the vertical and horizontal extent of at least one area in which intrinsic movements are to be expected.

By analogy with the first alternative, checking methods which are based on the fact that intrinsic movements are normally exhibiting symmetries can also be carried out for intrinsic movements detected with the second alternative.

For instance, sections which are supposed to be in a symmetrical relationship with one another can be evaluated on the basis of the function depending on the vertical position and/or the function depending on the horizontal position, and intrinsic movements can finally be detected if the symmetrical relationship is verified by a correlation analysis of the corresponding sections.

To make said checking method more robust with respect to relative deviations of the sections of the function which are supposed to be in a symmetrical relationship with one another, the sections may be standardized with respect to one another prior to the correlation analysis.

In addition or as an alternative to said checking method, the function depending on the vertical position and/or the function depending on the horizontal position can be evaluated, and intrinsic movements can be detected if it is determined by way of a correlation analysis that the values of the function depending on the vertical position and/or of the function depending on the horizontal position are irregular over a predetermined range.

Such an additional check will rule out that small changes that may add up in adverse cases are wrongly recognized in their sum as an intrinsic movement.

According to a preferred development of the above-discussed development of the inventive method intrinsic movements can be determined in the head portion of the person to be identified for verifying the authenticity of the recorded images.

This development has the advantage that the head portion as compared to the whole body of a person to be identified shows most of the intrinsic movements, which are also the most dominating ones. Thus, the method of the invention can be carried out in the most efficient way in the head region of a person to be identified.

Regions with particularly pronounced intrinsic movements in the head portion are e.g. the mouth region and/or the cheek region and/or the nose region and/or the eye region.

In a preferred development the intrinsic movements to be determined are intrinsic movements in at least two regions that are symmetrical to each other in the head portion of the person to be identified, and said at least two symmetrical regions are used for determining the axis of symmetry of the head portion.

With the symmetry axis found in this way it is possible to produce an image which can be used for identifying a person and in which a frontoparallel-rotated head region is transformed into a head region with a rotated axis of symmetry.

In addition or alternatively, an image of the person to be identified which can be used for identifying the person and which is composed of the left head region and the mirrored left head region or of the right head region and the mirrored right head region, respectively, can be produced by way of the symmetry axis found.

Both alternatives have the advantage that improved images can be provided for a later person identification. For instance, in the case of the first alternative, recorded images in which the head region of the person to be identified is inclined relative to the vertical can be used for image recognition. With the second alternative, it is also possible to use those images for person identification in which an image half is glared and which would thus be useless for the identification of a person.

According to another preferred development of all of the above-discussed embodiments the regions in the individual images or frames in which intrinsic movements are expected can be extracted from the individual images prior to the detection of the authenticity.

This development has the advantage that the images required for detecting the authenticity can be extracted from any desired video sequences.

Thus, the person to be identified has just to step into the visual field of the recording means. This has the advantage that optimum individual images can be selected from a plurality of individual images for respectively detecting the authenticity. Furthermore, it is not necessary that the person to be identified assumes a fixedly predetermined position so that the image recordings required for identifying the person and for verifying the authenticity can be made of said person.

Like in the detection of the authenticity, advantageously at least one differential image of two consecutive individual images of the sequence can be evaluated for reducing the data to be processed during extraction of the regions.

Furthermore, during extraction of the regions it is also possible to evaluate a differential image resulting from an AND operation of two consecutive differential images if the differential image to be finally evaluated is to be freed from changes resulting e.g. from the release of a dominating part of the background.

Likewise, each differential image can be binarized prior to evaluation and the binarizing operation can e.g. be carried out by means of a threshold value which is determined by evaluating the background of one of the differential images, e.g. by averaging the intensities of those pixels in the differential image that are in the region of the static background. As already discussed above in connection with the detection of intrinsic movements, the amount of the data to be processed can considerably be reduced by this development.

Analogously to the detection of the intrinsic movements the head region of the person to be identified can be extracted in an advantageous manner.

According to a preferred development the extracted head region can be transformed to a predetermined standard size for identifying the person. Variations in size which might lead to problems, in particular with respect to the computing time, in the complicated algorithms for face recognition can thereby be taken into account.

For extracting the head portion at least two head boundaries can be determined in the corresponding individual images or differential images, and the head region can be extracted on the basis of said head boundaries from the corresponding individual images or differential images.

According to a first alternative the determination of the head boundary in the corresponding individual images or differential images may include the determination of the upper and the left head boundary.

According to a second alternative the right head boundary can additionally be determined.

Expediently, but not limited thereto, each head boundary may be defined by a head boundary line which extends such that the contour of the head is substantially entirely located within the head boundary lines.

According to a preferred development the function of the vertical projections of the binarized differential image can be determined for determining the upper head boundary, and the upper head boundary can be defined by the first maximum of the absolute value of the first derivative of said function that is above a predetermined threshold value.

If high-frequency noise is to be eliminated, the function of the vertical projections could be smoothed with a low-pass filter prior to the definition of the head boundary.

For the determination of the left head boundary the function of the horizontal projections of the binarized differential image is determined, and the left head boundary can be defined by the first maximum of the absolute value of the first derivative of said function that is above a predetermined threshold value.

Alternatively, for the determination of the left head boundary the differential image can be divided into a plurality of vertically successive strips, the first strip being vertically downwardly adjacent to the upper head boundary determined; in each strip the function of the horizontal projections of the binarized differential image can then be determined, the absolute values of the first derivatives of the resulting plurality of functions of the horizontal projections can subsequently be formed, the sum of the resulting plurality of absolute values can be added, and the left head boundary can finally be defined as the first maximum of said sum that is above a predetermined threshold value.

The advantage of said second alternative is that the head region is only detected through the strips below the upper head boundary, and the shoulder portion positioned thereunder, which might lead to inaccurate results in the determination of the left head boundary, is masked.

In this case, too, the function(s) of the horizontal projections can optionally be smoothed with a low-pass filter prior to the definition of the head boundary.

By analogy with the first alternative regarding the determination of the left head boundary, it is possible to determine the function of the horizontal projections of the binarized differential image according to the preferred development in which the right head boundary is also determined, and the right head boundary can be defined by the last maximum of the absolute value of the first derivative of said function that is above a predetermined threshold value.

By analogy with the second alternative in the determination of the left head boundary, it is possible according to the preferred development in which the right head boundary is also determined, to divide the differential image into a plurality of vertically successive strips for the determination of the right head boundary; in this case the first strip is vertically downwardly adjacent to the upper head boundary determined, the function of the horizontal projections of the binarized differential image is determined in each strip, the absolute values of the first derivatives of the resulting plurality of functions of the horizontal projections are formed, the sum of the resulting plurality of absolute values is added, and the right head boundary is defined as the last maximum of said sum that is above a predetermined threshold value.

It is here also possible to smooth the function or functions of the horizontal projections with a low-pass filter prior to defining the head boundary.

According to a preferred development it might be intended in the determination of the head boundaries that two successive individual images or the differential images obtained therefrom are only used for determining the head boundaries if a change between the two consecutive individual images is within a predetermined range.

It is thereby easily possible to make sure even before the determination of the head boundaries that only those differential images are used for a determination in the case of which it is ensured that sufficiently reliable results for the head boundaries can be obtained therefrom. Since the change between two consecutive individual images must be greater than a predetermined value (so that head boundaries can be calculated according to said preferred development), it is ensured that in both images a change going beyond normal noise and thus an actual movement of the person to be identified have taken place. Since the change between two consecutive individual images must be smaller than a predetermined value (for calculating head boundaries), differential images in which an excessively strong movement is reflected, as is e.g. produced by shaking the recording means or an extremely fast movement of the person to be identified, are left out of consideration in determining the head boundaries.

According to a particularly advantageous development with respect to the necessary computing time, a motional intensity can be calculated for determining the change between two consecutive individual images. In the case of a gray-level image the motional intensity can substantially be calculated through the sum of the gray level of the differential image. In a binarized differential image the motional intensity can expediently be calculated as the sum of the 1 pixel or 0 pixel of the binarized differential image.

According to a preferred development predetermined head boundaries can be used for extracting the head region in the case where no head boundaries can be determined.

According to a further advantageous development predetermined head boundaries can be used for extracting the head region if one of the head boundaries determined is not within predetermined limits. Alternatively, the step for determining the head boundaries can be carried out with successive differential images.

It is thereby possible to perform an additional plausibility check of the boundaries determined in the method. In other words, it is checked whether in the region defined by said head boundaries the head of a person would actually have to be expected with respect to the arrangement of the device. If the head boundaries determined are not plausible, predetermined head boundaries are assumed in the end. Thanks to this additional check the quality of the determination of the head boundary and, in the final analysis, the quality of the verification of the authenticity can additionally be enhanced.

Expediently, in the above-described developments for determining the head boundaries, the lower or the right and lower head boundaries can be defined such that a square head region is extracted from the corresponding individual images or differential images.

According to a preferred development of all of the previously described variants of the method of the invention a stabilized differential image which is evaluated for determining the intrinsic movements and/or for extracting the regions in which intrinsic movements are to be determined can be evaluated on the basis of two consecutive images.

This development can be used independently of and alternatively to the extraction methods for regions in which intrinsic movements are expected. Thus all of the advantages mentioned in connection with the determination of the head boundaries could here be mentioned as an advantage.

On the other hand, said development can also be used for increasing the accuracy of the regions with intrinsic movements, as determined in the extracting process.

A stabilization can here be carried out by means of a correlation correction.

According to a predetermined development the correlation correction can be carried out by template matching which comprises calculating the differential image. in the case of which in calculating the differential image the first individual image used for forming the differential image is shifted relative to the second individual image used for forming the differential image in such a way that a correction function between the two individual images is maximum.

According to another advantageous development, two consecutive individual images or differential images obtained therefrom are only used in the above-described methods for determining the intrinsic movements if the change between the two consecutive individual images is within a predetermined range.

It is thereby possible to select consecutive individual images already at the beginning of the inventive method for obtaining sufficiently reliable results of the verification.

In particular, it is easily possible to make sure already before the determination of the intrinsic movements that for the determining process use is only made of differential images by which it is ensured that sufficiently reliable results can be obtained therefrom. Since the change between two consecutive individual images must be greater than a predetermined value (so that according to said preferred development the attempt is made to determine an intrinsic movement), it is ensured that in the two images a change going beyond normal noise and thus an actual movement or an intrinsic movement of the person to be identified has taken place. Since the change between two consecutive individual images has to be smaller than a predetermined value (for calculating head boundaries), differential images which reflect excessive movements, as are e.g. caused by shaking the recording means or by an extremely fast movement of the person to be identified, are not used for determining the intrinsic movements.

Preferably, the change between two consecutive individual images can be calculated through a motional intensity. Like in the determination of the head boundaries, the motional intensity can be calculated for a gray-level image through the sum of the gray levels. By analogy, the motional intensity can expediently be calculated for a binary differential image through the sum of the 1 pixel or 0 pixel of the binarized differential image.

BRIEF DESCRIPTION OF THE DRAWINGS

Further advantages and features of the method according to the invention will become apparent from the description of detailed embodiments of the invention. with reference to the drawing, in which.

DETAILED DESCRIPTION OF THE INVENTION

Figure 1:
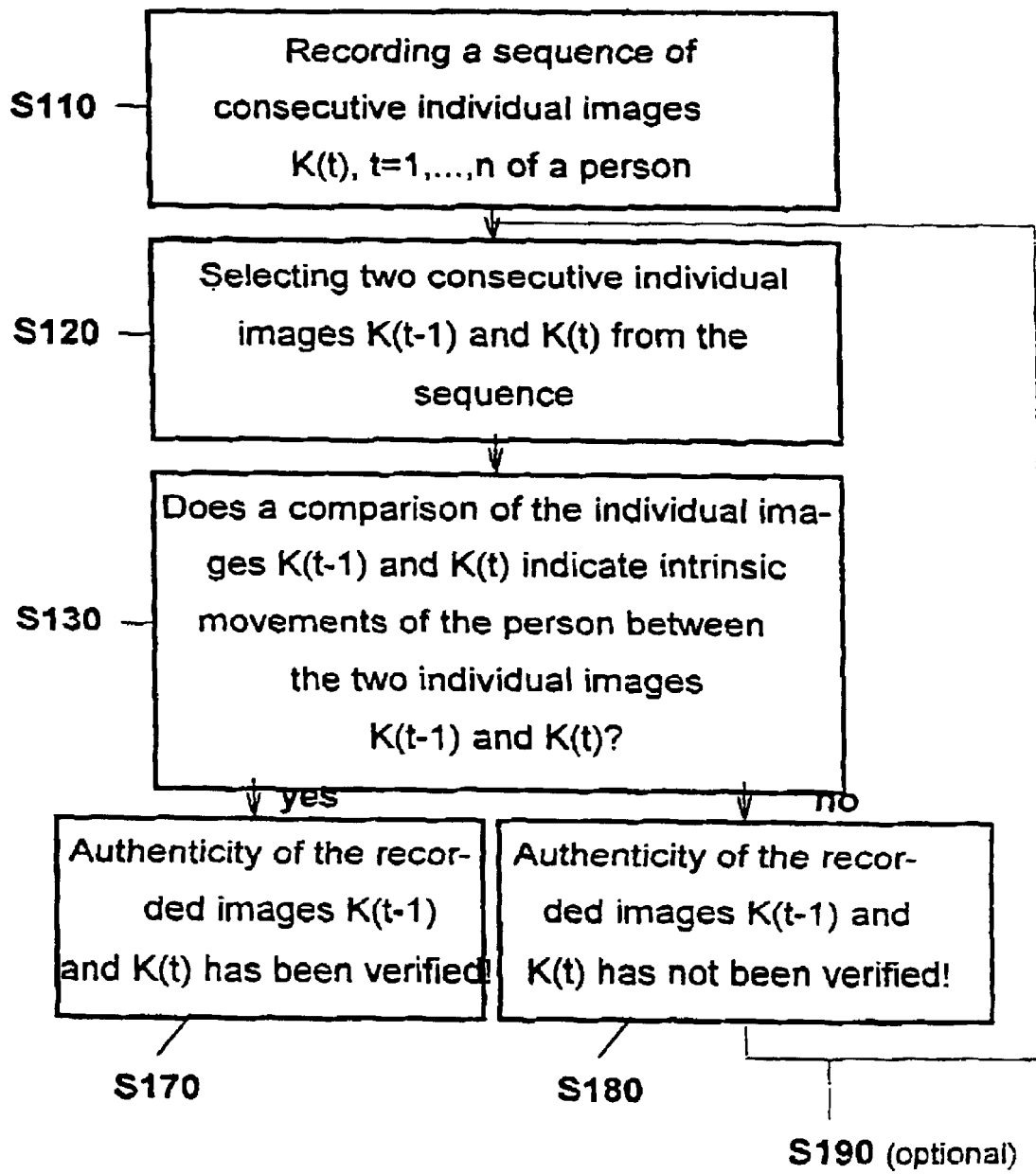
FIG. 1 is a sequence diagram of a first embodiment of the method for verifying the authenticity of an image recorded in a person identifying process, according to the present invention.

FIG. 1 shows a sequence diagram of an inventive method for verifying the authenticity of an image recorded in a person identifying process and belonging to a person to be identified.

In a first step S110 a sequence of consecutive individual images or frames K(t), t=1, . . . , n of a person is recorded. To this end, use is expediently made of prior-art video cameras which record the sequence in digitized form. Individual images recorded with such a video camera are normally present in the form of pixels, each individual image comprising c×r pixels if c designates the number of the columns and r the number of the lines of the corresponding individual image.

In the following K(t) therefore stands for the whole individual image at time t and $K_{cr}(t)$ for the pixel in the c-th column and the r-th row.

The individual images or frames are recorded in the inventive method at a speed of 8–12 images/per second.

In step S120, two consecutive individual images K(t−1) and K(t) are chosen from the recorded sequence of individual images.

In the subsequent step S130, the individual images (K(t−1) and K(t) are compared with each other to find out whether the person subjected to an identification has performed intrinsic movements between two individual images K(t−1) and K(t).

To this end the two individual images K(t−1) and K(t) can be compared with each other pixel by pixel, and the change resulting from said comparison of pixels can be compared with a predetermined threshold value. Thus if the amount of change is above the predetermined threshold value, the person has performed an intrinsic movement between two individual images K(t−1) and K(t), whereas if the amount of change is below the threshold value, no intrinsic movements of the person could be detected. Said pixel-by-pixel comparison yields satisfactory results if no additional movements are superimposed on the intrinsic movements of the person, i.e. if the person does not move or only moves minimally with respect to the image recording means.

How the comparison has to be made in detail depends on the type of the consecutive individual images. If the individual images are e.g. present as gray-level images, the amount of the difference of the gray levels of two corresponding pixels in the individual image K(t−1) and K(t) can be regarded as a measure of the change in a pixel, and the sum of the amounts of said differences as a measure of the change between the two individual images K(t−1) and K(t) that are finally compared with the predetermined threshold value.

If the individual images are e.g. present in binarized form (i.e. in the form of white or black pixels), the change between two individual images follows from the sum of the differing pixels corresponding to each other in the individual images K(t−1) and K(t). Thus, in the case of binarized individual images said change has to be compared with a predetermined threshold value. The binarization of gray-level images will be described in detail in connection with the second embodiment (step S240).

Finally, if the comparison in step S130 shows that intrinsic movements of the person have taken place between the two individual images, the authenticity of the recorded individual images K(t−1) and K(t) is verified in step S170.

By contrast, if the comparison shows that the person has not performed intrinsic movements between the individual images K(t−1) and K(t), the authenticity of the recorded individual images K(t−1) and K(t) cannot be verified in step S180.

In this case it is possible to interrupt the method and if said method is used within the scope of an access control, access can be denied. Alternatively, as shown by step S190, it is possible to jump back to step S120, and the method for verifying the authenticity can be carried out again with two further individual images, e.g. K(t) and K(t+1).

The loop shown by step S190 can be passed through j times, j being a predetermined number which is n−1 at the most.

Alternatively to the comparison of the individual images K(t−1) and K(t), a differential image D(t)=K(t)−K(t−1) can be formed for reducing the amount of data to be processed, and finally the differential image D(t) can directly be analyzed to find out whether the person has performed intrinsic movements between the two individual images K(t−1) and K(t).

According to a further alternative of the first embodiment, instead of the differential image D(t) an AND operation of two consecutive differential images D(t) and D(t−1) can be evaluated for detecting the intrinsic movements. Said alternative is particularly useful when there are great changes in two consecutive individual images due to the release of a dominating background, for instance a source of illumination, in two consecutive individual images, and when these are reflected in the differential image. Thus, the differential image to be assessed in the final analysis can be freed by said alternative from changes that do not result from intrinsic movements.

Since in said alternative two differential images D(t) and D(t+1) are used, three consecutive individual images K(t−1), K(t) and K(t+1) are needed for producing said two differential images.

Figure 2:
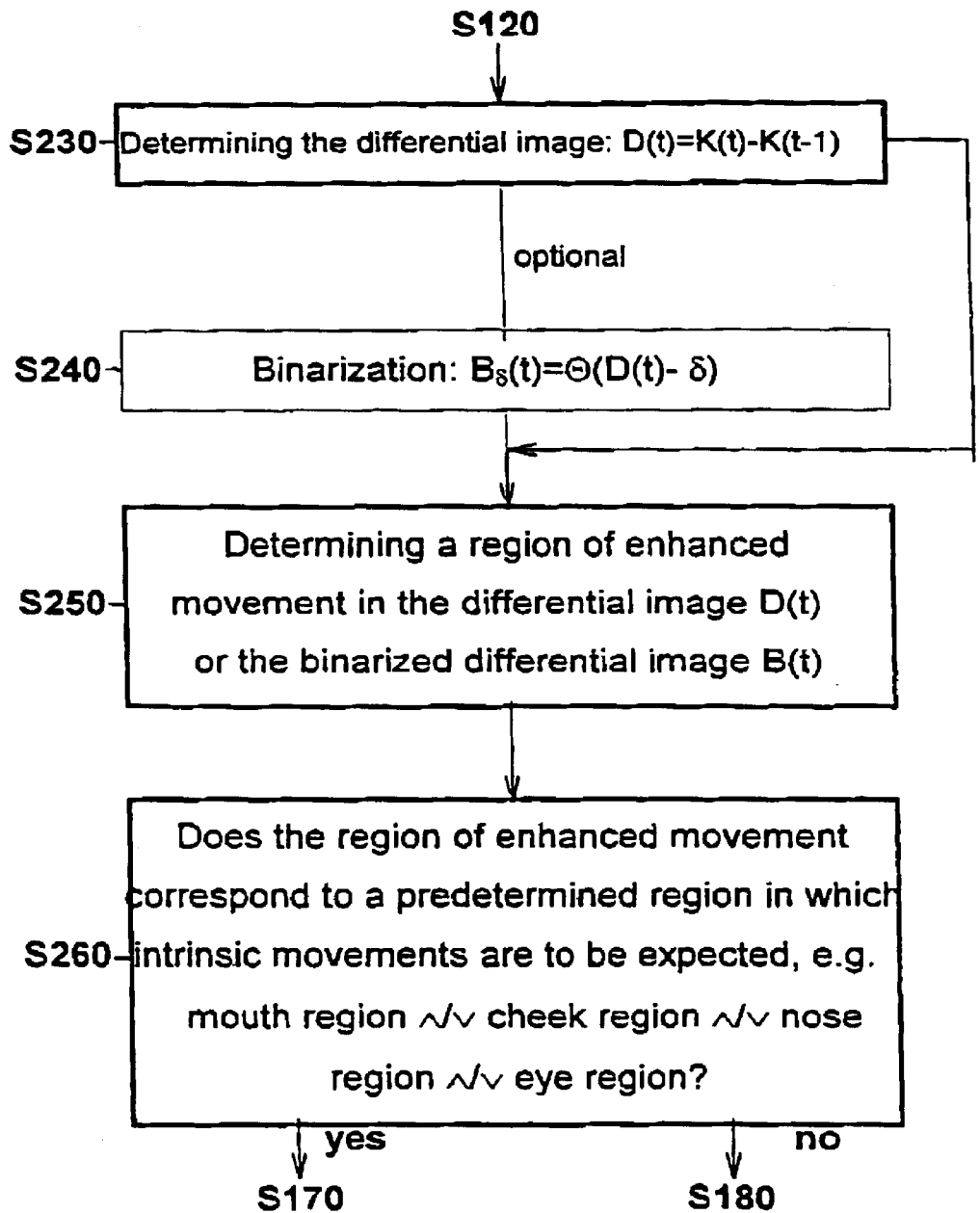
FIG. 2 is a sequence diagram of a second embodiment of the method for verifying the authenticity according to the present invention.

FIG. 2 shows a sequence diagram of a second embodiment of the method according to the invention.

Said second embodiment is predominantly an alternative to step 130 in the first embodiment.

Thus, according to the second embodiment, steps S110 and S120 are also passed through first, i.e. a sequence of consecutive individual images is recorded and two consecutive individual images are chosen from said sequence.

Following step S230 the differential image D(t) is determined in step S230 from the individual images K(t) and K(t−1).

In the optional step S240 said differential image can be binarized according to the following equation:

$$B_\delta(t) = \Theta(D(t) - \delta). \qquad (1)$$

δ is here a predetermined threshold value, and θ(l) designates the step function, i.e., θ(l)=0 for l<0, and θ(l)=1 for l≧0.

The threshold value δ may be fixedly predetermined or determined by evaluation of the background.

In the last-mentioned case, the threshold value δ should be defined as a function of the upper m lines of the differential image because said lines only show static background, and values different from 0 in the differential image are thus due to noise caused, for instance, by the recording device. Consequently, noise is suppressed if only gray-level values above said threshold value are considered. Thus the maximum value found in the uppermost m lines of the differential image should be used as the threshold value, i.e.

$$\delta = \max_{c,r<m} D_{cr}(t), \qquad (2)$$

In the next step S250, at least one region of enhanced movement is determined in the differential image D(t) or in the binarized differential image B(t).

To this end a masking frame of any desired size may be predetermined and guided over the corresponding differential image, and upon each shift the movement is calculated, i.e. the number of the sum of the pixels with the value 1 or, alternatively, of the pixels with the value 0. The masking frame of the shift with the largest sum finally defines the region of enhanced movement.

After the region of enhanced movement has been determined in the differential image or the binarized differential image, it is checked whether said region corresponds to a predetermined region in which intrinsic movements are to be expected.

If this is the case the authenticity of the recorded individual images K(t−1) and K(t) underlying the differential image D(t) or the binarized differential image B(t) are verified in step S170.

If the region of enhanced movement is not identical with the predetermined region, the authenticity of the recorded individual images cannot be verified in step S180, and the method may be interrupted or repeated according to step S190 (see FIG. 1).

The region in which most of the intrinsic movements of a person have to be expected is the head region. In the head region as such, most of the intrinsic movements are to be expected in the mouth region, the cheek region, the nose region or the eye region. Preferably, according to the second embodiment in FIG. 2, the at least one determined region of enhanced movement is therefore compared with the mouth region, the cheek region, the nose region and/or the eye region.

As already implicitly pointed out, it is of course also possible to determine several regions of enhanced movement in the differential image and to check whether said determined regions of enhanced movement correspond to the mouth region, the cheek region, the nose region and/or the eye region.

Figure 3:
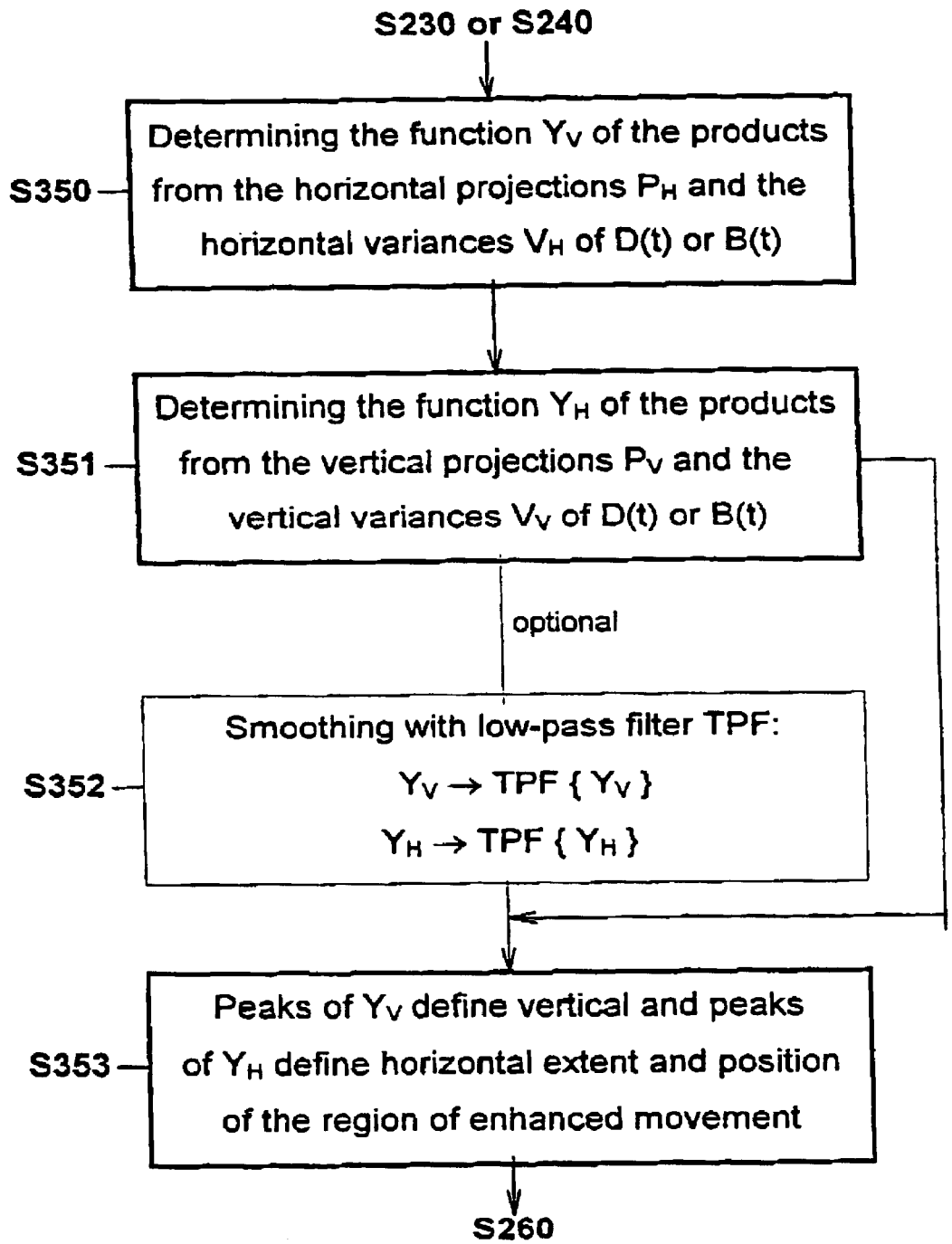
FIG. 3 is a sequence diagram of a third embodiment of the method for verifying the authenticity according to the present invention.

FIG. 3 shows a sequence diagram of a third embodiment of the method of the invention, which illustrates an alternative to step S250 in the second embodiment, i.e. the determination of the region of enhanced movement, and, moreover, corresponds to the second embodiment.

Hence, in the third embodiment a differential image D(t) or, alternatively, a binarized differential image B(t) is started from. The differential image D(t) or the binarized differential image B(t) will be abbreviated in the following text as differential image K.

In step S350, the function $Y_V$ of the products from the horizontal projections $P_H$ and the horizontal variances $V_H$ is determined on the basis of the differential image K, in formulae:

$$Y_V = P_H \cdot V_H = \left(\sum_c K_{cr}\right) \cdot \left(\frac{1}{nc}\sum_c (K_{cr} - \overline{K}_r)^2\right), \quad \text{with} \qquad (3)$$

$$\overline{K}_r = \frac{1}{nc}\sum_c K_{cr}, \quad \text{and}$$

$nc$ = number of columns of $K$.

Furthermore, in step S351, the function $Y_H$ of the products from the vertical projections $P_V$ and the vertical variances $V_V$ is determined from the differential image K according to the following formula:

$$Y_H = P_V \cdot V_V = \left(\sum_r K_{cr}\right) \cdot \left(\frac{1}{nr}\sum_r (K_{cr} - \overline{K}_c)^2\right), \quad \text{with} \qquad (4)$$

$$\overline{K}_c = \frac{1}{nr}\sum_r K_{cr}, \quad \text{and}$$

$nr$ = number of columns of $K$.

In step S352, the functions $Y_V$ and $Y_H$ obtained according to the above formulae can be smoothed with a suitable low-pass filter TPF{ }.

In functions $Y_V$ and $Y_H$ or the smoothed functions TPF{$Y_V$} and TPF{$Y_H$}, peaks are identified in step S353. The peaks of $Y_V$ and $Y_H$, respectively, define the vertical and horizontal extent and position of the region of enhanced movement.

Various definitions which are known in the prior art can be given as a relation between the peak of one of the functions and the corresponding region of enhanced movement. For instance, the position of the corresponding region can be indicated by the maximum value of a peak and the extent of said region by the FWHM (full width of half maximum) of the peak. Alternatively, the extent can also be indicated by the turning points of the peak. As a further alternative, the extent can also be indicated by the boundaries which lead to a predetermined area below the peak.

Standard prior-art methods can be used for finding the individual peaks. These methods substantially consist in looking for the sections of a function that exceed a predetermined threshold value.

The definition to be used for the peak and the best method for finding the peak strongly depend on the specific intrinsic movement to be detected; the most advantageous definition for the peak and the most advantageous method for finding the peak can be determined by way of tests for each individual case. It should be noted that a detailed description of a specific definition for the peak and of the method used for finding the peak will be given in connection with the embodiment described in FIG. 5.

Figure 4:
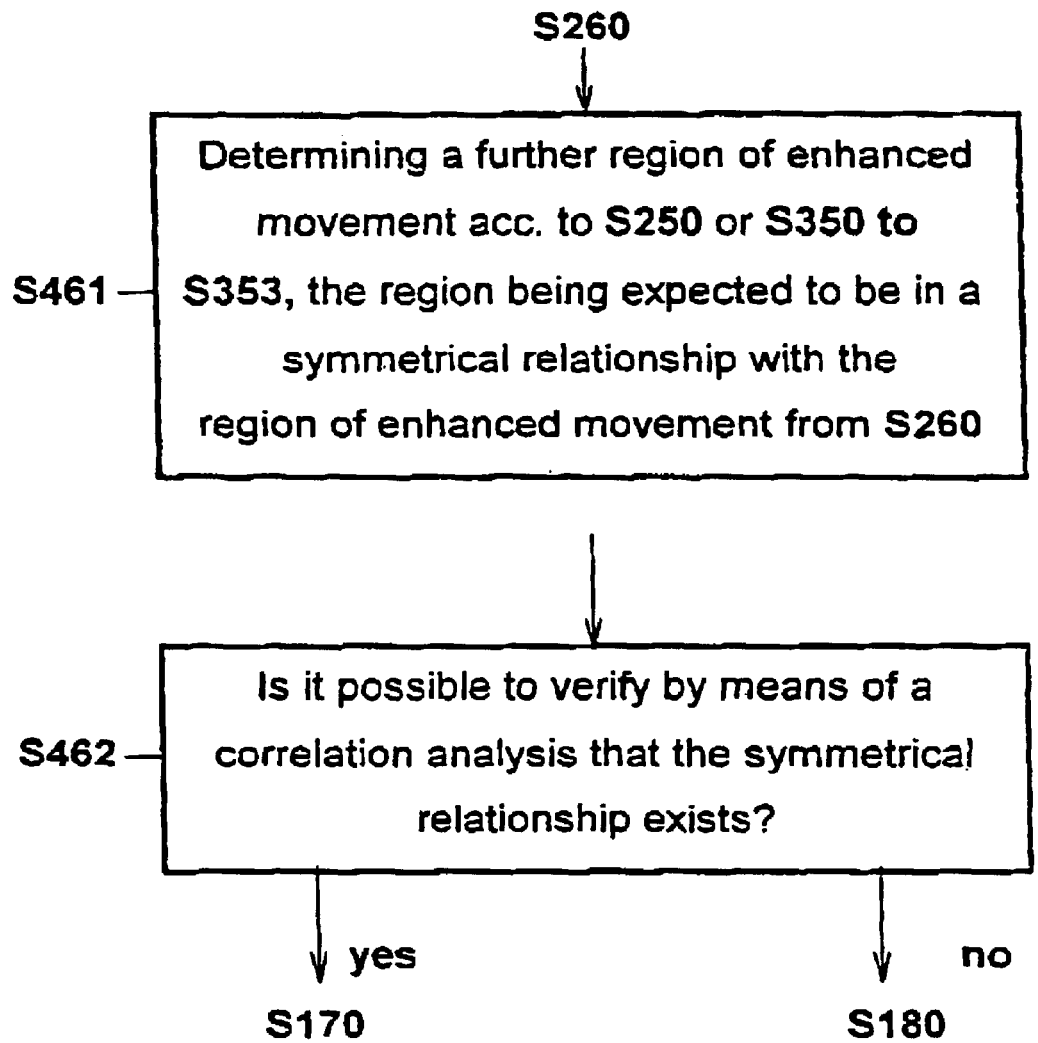
FIG. 4 is a sequence diagram of a fourth embodiment of the method for verifying the authenticity according to the present invention.

FIG. 4 is a sequence diagram showing a fourth embodiment of the method of the invention. Said fourth embodiment is an extension of the second and third embodiment.

It is presupposed for the performance of the method according to the fourth embodiment that a first region of enhanced movement has already been determined and that it has been checked whether said region corresponds to a predetermined region in which intrinsic movements are to be expected.

If such a region has been found, a further region of enhanced movement which is supposed to be in a symmetrical relationship with the first region of enhanced movement is determined according to the fourth embodiment in step S461.

For determining said second region, step S250 (second embodiment) may be passed through, or steps S350 to S353 (third embodiment).

It should here be noted that a symmetrical relationship between two regions in a differential image, i.e. a symmetrical relationship in the movements, must be expected when the regions resulting in the intrinsic movements are symmetrical with each other. For instance, when the head region of a person to be identified is considered, the mouth region in the left and right face halves, the cheek region in the left and right face halves, the nose region in the left and right face halves as well as the left and right eye, are suited as the first and second region within the scope of the fourth embodiment.

When two of said regions that are supposed to have a symmetrical relationship have been found in the differential image, it can be verified by means of a correlation analysis whether or not the symmetrical relationship exists.

On account of the fact that the intrinsic movements, e.g. in the head region of a person, are symmetrical, a plausibility check of the determined regions of enhanced movement is thus obtained through the fourth embodiment.

Hence, if it is verified in step S462 by way of a correlation analysis that the symmetrical relationship exists, the authenticity of the recorded individual images can be verified in step S170.

In the other case the authenticity cannot be verified (see step S180) and the method is thus interrupted with such a result or, as already discussed above, repeated.

The various possibilities of performing a correlation analysis according to S462 will be explained in detail below in connection with FIG. 7.

Figure 5:
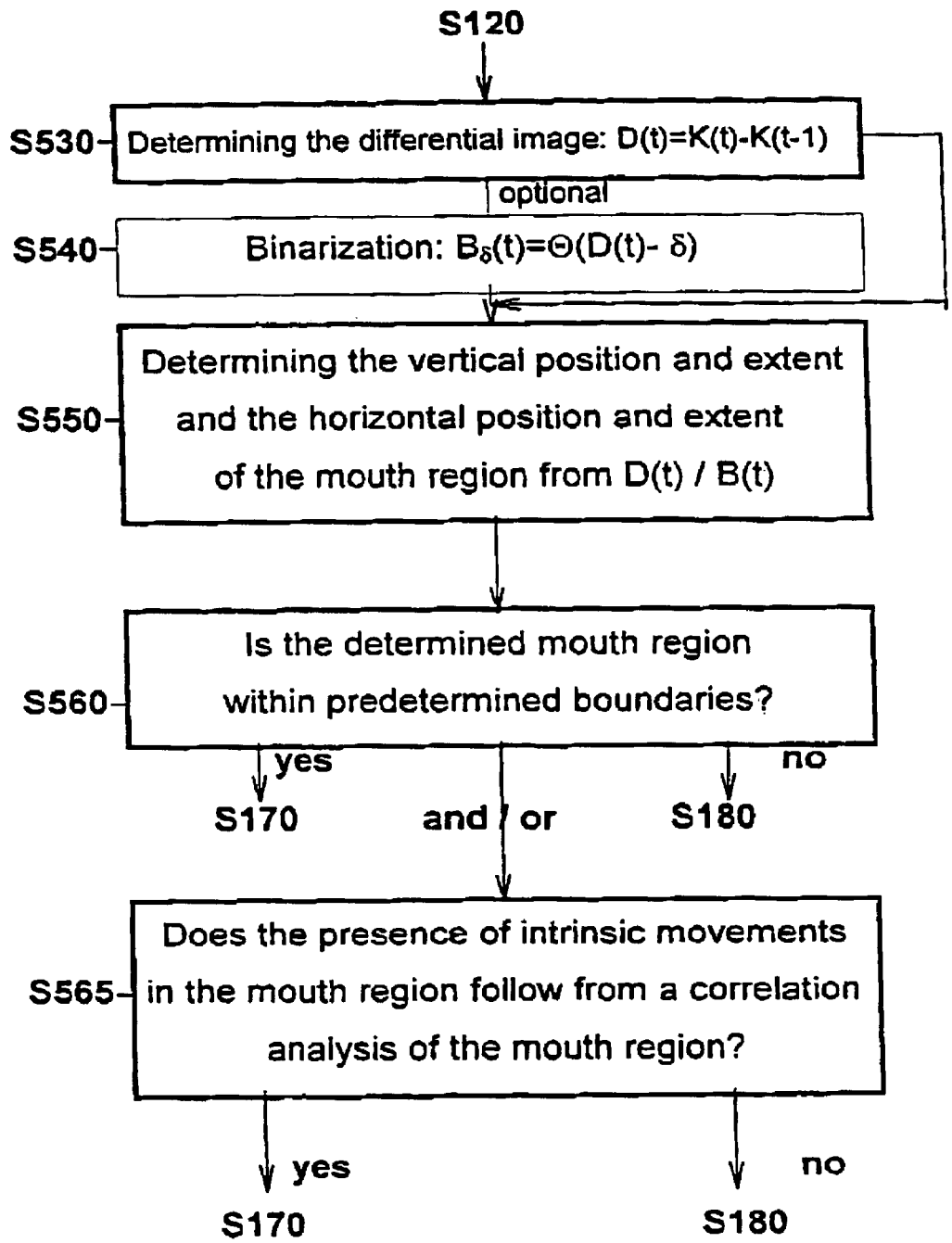
FIG. 5 is a sequence diagram of a fifth embodiment of the method for verifying the authenticity according to the present invention.

FIG. 5 shows the sequence diagram of a fifth embodiment of the method according to the invention. Steps S530 to S565, which are shown in FIG. 5, illustrate a preferred embodiment of step S130 according to the first embodiment.

Hence, a sequence of consecutive individual images of a person is first recorded in the fifth embodiment as well, and two consecutive individual images are then selected from said sequence. This is illustrated in FIG. 5 by step S120.

On the basis of said individual images, a differential image is determined in step S530 and optionally binarized in step S540 (steps S530 and S540 correspond to steps S230 and S240 in the second embodiment, so that a description is here not needed and reference is made to the corresponding description of steps S230 and S240).

According to the fifth embodiment the vertical position and the extent as well as the horizontal position and the extent of the mouth region of a person to be identified are determined on the basis of the differential image in step S550.

In contrast to step S250 in the second embodiment, in which regions of enhanced movements are determined in the differential image and a check is carried out whether said regions can be assigned to specific regions, a specific region in which intrinsic movements are expected, namely the mouth region, is looked for in step S550.

It is then checked in step S560 whether or not the determined mouth region is within predetermined boundaries. If the mouth region is within predetermined boundaries, the authenticity of the recorded individual images can be verified in step S170; if the determined mouth region is not within predetermined boundaries, the verification of the authenticity of the individual images must be denied.

Moreover, as an alternative to step S560, a correlation analysis can be carried out in step S565 with the determined mouth region for detecting intrinsic movements.

Various possibilities of carrying out a correlation analysis will be explained in detail in connection with FIG. 7.

In a modification of the fifth embodiment, it is also possible to carry out steps S560 and S565 not alternatively, but cumulatively. Thus, according to step S170 the authenticity of the individual images will only be detected if the determined mouth region is within predetermined boundaries and if the presence of intrinsic movements follows from a correlation analysis of the mouth region.

Although the fifth embodiment specifically relates to the mouth region, it is of course possible to carry out the method with other regions in which intrinsic movements are expected, or with combinations of such regions.

Figure 6:
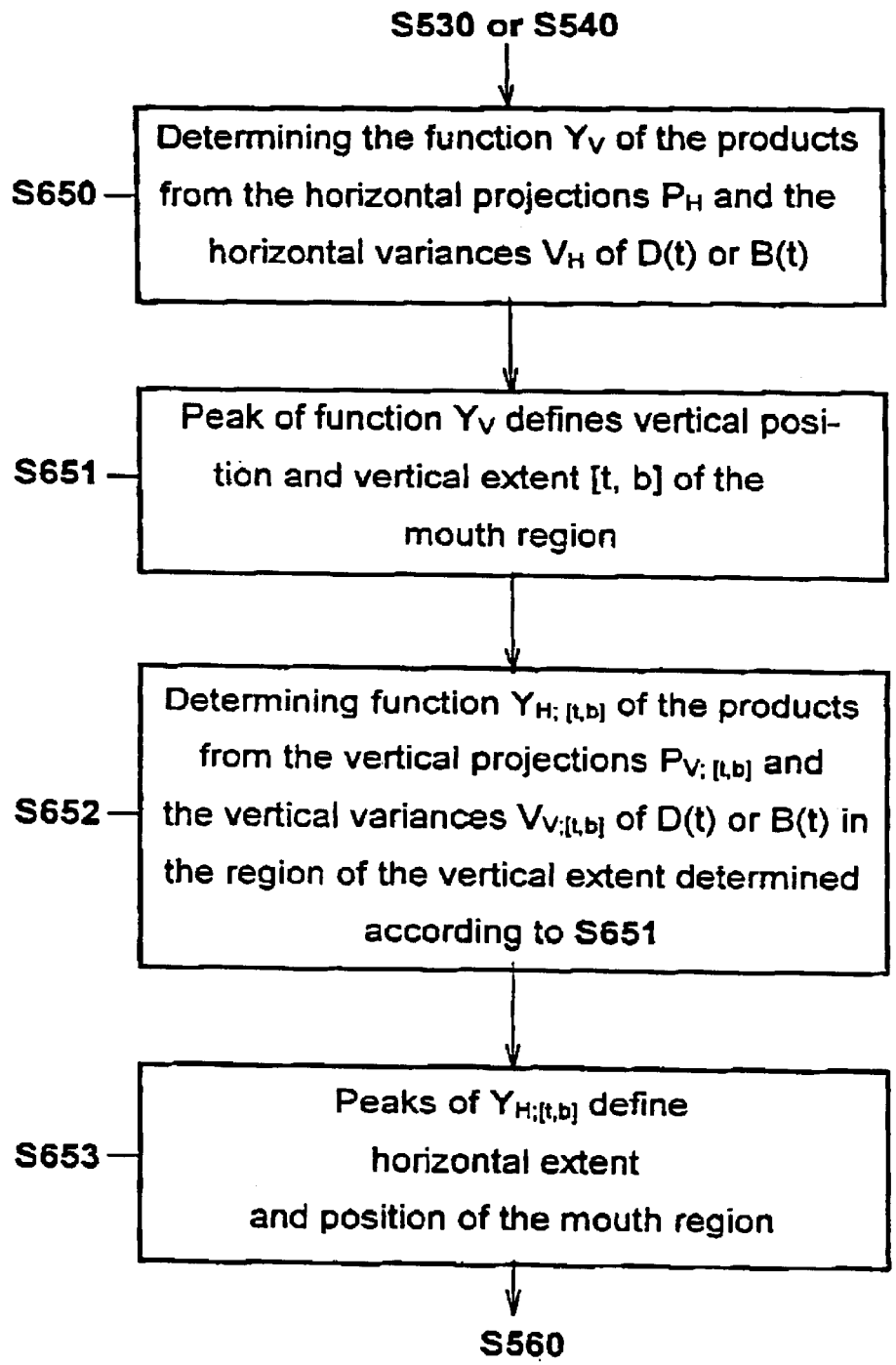
FIG. 6 is a sequence diagram of a sixth embodiment of the method for verifying the authenticity according to the present invention.

FIG. 6 is a sequence diagram showing a sixth embodiment of the inventive method. Said sixth embodiment is a preferred development of step S550 in the fifth embodiment for determining the vertical position and extent and the horizontal position and extent of the mouth region on the basis of the differential image. Thus, it is presupposed that according to step S530 a differential image D(t) or according to S540 a binarized differential image B(t) is present.

On the basis of said differential image, the function $Y_V$ of the products from the horizontal projections $P_H$ and the horizontal variances $V_H$ is calculated in step 650 according to equation (3).

The function $Y_V$ can optionally be smoothed with a low-pass filter.

The vertical position and the vertical extent of the mouth region are determined on the basis of said function or the smoothed function in step S651.

The vertical mouth position is here defined as the position of the last (lowermost) maximum of $Y_V$ that is greater than a predetermined threshold value. In the case of the mouth region twice the mean of $Y_V$ has turned out to be a suitable threshold value.

The width of the peak in which the peak has dropped to a predetermined percentage of its maximum value can be indicated as the vertical extent of the mouth region. 50% has here turned out to be an advantageous value.

As an alternative, the vertical extent of the mouth region can also be indicated as the width of the peak which follows from the distance of the two closest turning points at the left and right side from the peak position.

Moreover, the values obtained for the vertical position and the vertical extent can be checked as to their plausibility. To this end a minimum mouth position and a maximum mouth position can be predetermined, and it can be checked whether the determined mouth position is within said two extreme values. Said procedure can be carried out alternatively or cumulatively for the vertical extent of the mouth region.

The function $Y_{H;t,b}$ of the products from the vertical projections $P_{V;t,b}$ and the vertical variances $V_{V;t,b}$ in a horizontal strip extending from the upper mouth boundary t determined in step 651 to the lower mouth boundary b, namely $$Y_{H;t,b} = P_{V;t,b} \cdot V_{H;t,b} = \left(\sum_{r=1}^{b} K_{cr}\right) \cdot \left(\frac{1}{n}\sum_{r=1}^{b}(K_{cr} - \overline{K}_c)^2\right), \quad \text{with} \quad (5)$$

$$\overline{K}_c(t) = \frac{1}{n}\sum_{r=t}^{b} K_{cr}, \quad n = b - t + 1, \quad \text{and}$$

$nr$ = number of columns of $K$, is then calculated in the next step 652.

The function $Y_{H;t,b}$ calculated in this way can also be smoothed in an optimum manner.

In the next step S653, the horizontal position and extent of the mouth region are determined.

To this end the absolute value of the derivative of the function $Y_{H;t,b}$ or of the smoothed function $TPF\{Y_{H;t,b}\}$ is determined, i.e.

$$b_{H;t,b} = |y_{H+1;t,b} - y_{H+1;t,b}|, \quad (6)$$

The left horizontal boundary of the mouth region is then defined as the first maximum of $b_H$ that is greater than a predetermined threshold value. The right horizontal boundary of the mouth region is defined accordingly as the last maximum of $b_H$ that is greater than said threshold value. In the instant case the mean of $b_H$ has been used as the threshold value.

In the case of the horizontal extent of the mouth a plausibility check can also be carried out such that the determined mouth region has to lie within a predetermined maximum region so that the region of enhanced movement is regarded as the mouth region.

Figure 7:
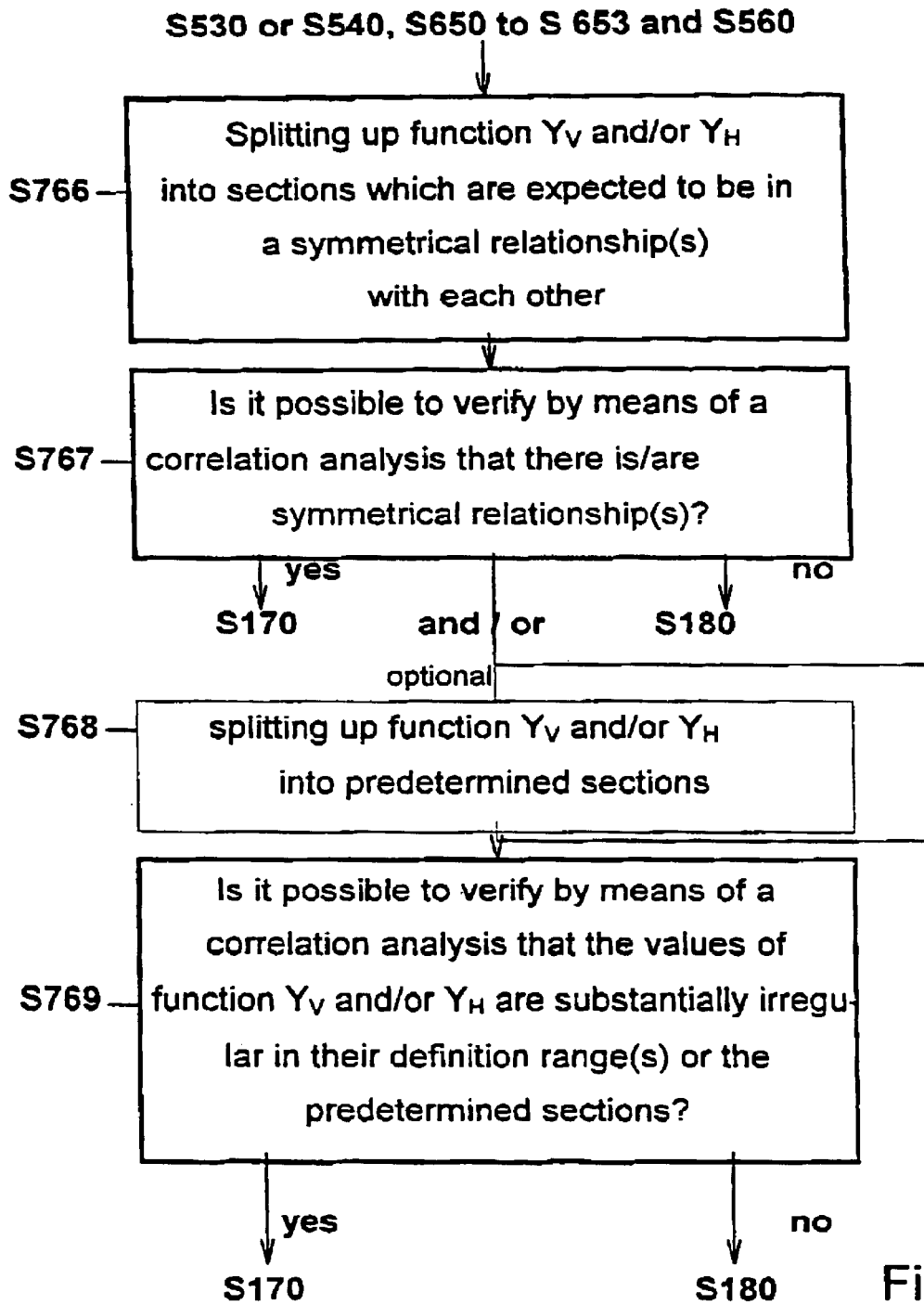
FIG. 7 is a sequence diagram for performing a correlation analysis which can be used within the scope of the fourth or fifth embodiment of the method for verifying the authenticity according to the present invention.

FIG. 7 shows a sequence diagram of a correlation analysis, as can e.g. be carried out in step S462 according to the fourth embodiment or in step S565 according to the fifth embodiment.

Although the procedure according to the sequence diagram in FIG. 7 is explained with reference to the functions $Y_V$ and $Y_H$, it can readily be applied to the regions as determined in the fourth embodiment.

In step S766, function $Y_V$ and/or $Y_H$ is split up into sections which are supposed to be in a symmetrical relationship with one another.

In step S767, it is checked by means of a correlation analysis whether there is the symmetrical relationship assumed in step S766.

Steps S766 and S767 can of course also be carried out for several symmetrical relationships.

If it can be verified with the correlation analysis that there is/are the symmetrical relationship(s), the authenticity of the recorded individual images can be verified according to S170.

If the symmetrical relationship cannot be verified with the correlation analysis, the authenticity of the individual images cannot be verified either, and the method may be interrupted or, alternatively, be repeated for a new pair of individual images.

The following correlations can be checked in step S767 for the already discussed case regarding the determination of intrinsic movements in the mouth region.

On the one hand, an intrinsic mouth movement is symmetrical in itself. Therefore, the correlation of curve $Y_H$ and of the smoothed curve $TPF\{Y_H\}$, respectively, with the mirrored curve $Y_H$ and the mirrored smoothed curve $TPF\{Y_H\}$, respectively, must be greater than a predetermined value.

Expediently, prior to the correlation analysis curve $Y_H$ is transformed to standardized variables so that the function $Y_H$ has the mean value 0 and the standard deviation 1. When said standardized variables are designated as $n(Y_{H/V})$, the correlation is calculated according to the formula $$g_m = \sum_{c=-nc/2}^{nc/2-1} n_{m+c}(Y_H) \cdot n_{m-c}(Y_H), \quad (7)$$

where $n_c(Y_H)$ is continued for indices $c<0$ and $c \geq n_c$ with 0.

It has been found in the case of a mouth movement that a value of $g_m > 0.9$ corresponds to a sufficiently symmetrical mouth movement. Thus, the expected symmetrical relationship would be confirmed if $g_m > 0.9$ followed from equation (7).

As an alternative or in addition to the above-described correlation analysis, it is possible to check the correlation of the image section from the differential image of the mirrored mouth with the mouth itself. When said correlation is smaller than a predetermined value, it can be assumed that an actual intrinsic movement has not taken place, but the determined movement is due to movements, noise, or the like.

The correlation of the differential image of the mirrored mouth with the mouth itself can be determined by the expression $$h_m = \sum_{c=-e/2}^{e/2} n_{cnt+c}\left(\sum_{r'=t}^{b} K_{cr'}\right) \cdot n_{cnt-c}\left(\sum_{r'=1}^{b} K_{cr'}\right), \quad (8)$$

where cnt is the horizontal position and e the width of the mouth and can be determined by $$cnt = \underset{m}{\operatorname{argmax}} g_m \quad (9)$$

It has been found that a value of $h_M = 0.5$ is suited for discriminating between intrinsic and non-intrinsic movements.

Together with the above-described correlation analyses or alternatively, a further correlation analysis is provided for in steps S768 and S769.

For carrying out said correlation analysis function $Y_V$ and/or $Y_H$ can be split up into predetermined sections in step S768. Said step, however, is only provided for the case that specific regions of the corresponding function are to be analyzed. If the function $Y_V$ and/or $Y_H$ is to be analyzed in its entirety, step S768 can consequently be dispensed with.

In step S769, it is checked by means of a correlation analysis whether the values of the corresponding function within their range of definition (or in the predetermined sections if step S768 is carried out) are substantially irregular.

If the values are irregular, the conclusion can be drawn that an intrinsic movement is actually concerned. By contrast, in the case of regular values of the function the conclusion can be drawn that the movements determined are not movements but rather noise, or the like.

For carrying out the correlation analysis according to step S769, correlations between the vertical projections and vertical variances for the right and left side of the mouth can be checked in the case of the mouth region.

The correlation between the vertical projection and the vertical variance for the right and left side of the mouth can be calculated by the expressions $$i_m = \sum_{c=0}^{e/2} n_{cnt+c} \left( \sum_{t'=t}^{b} K_{cr'} \right) \cdot n_{cnt+c} \left( \sum_{r'=t}^{b} (K_{cr'} - \overline{K}_c)^2 \right), \quad (10)$$

$$i_m = \sum_{c=-e/2}^{0} n_{cnt+c} \left( \sum_{t'=t}^{b} K_{cr'} \right) \cdot n_{cnt+c} \left( \sum_{r'=t}^{b} (K_{cr'} - \overline{K}_c)^2 \right).$$

In the case of the mouth region it has been found that the correlations $i_m$ and $j_m$ between the vertical projection and the vertical variance must be $\leq 0$ to ensure that the detected movement is an intrinsic movement.

In the methods according to FIGS. 5 to 7 the mouth region is shown as an exemplary embodiment of the method according to the invention. However, as already explained in connection with the second embodiment, the method of the invention is not limited to the mouth region.

Rather any regions in which intrinsic movements have to be expected, e.g. the cheek region, the nose region and the eye region, or any combinations of said regions, are possible.

If a region which differs from the mouth region is to be analyzed as to intrinsic movements, only the regions in which the functions are formed, the correlations which are analyzed within the correlation analysis, as well as the threshold values with which a correlation is verified, have to be adapted accordingly to the regions considered.

Since the principles according to which such an adaptation has to be carried out are obvious by virtue of the above-explained example of the mouth region and the fundamentals found in standard textbooks on correlation analysis, a detailed description of the adaptation to the other above-mentioned regions is dispensed with.

Figure 8:
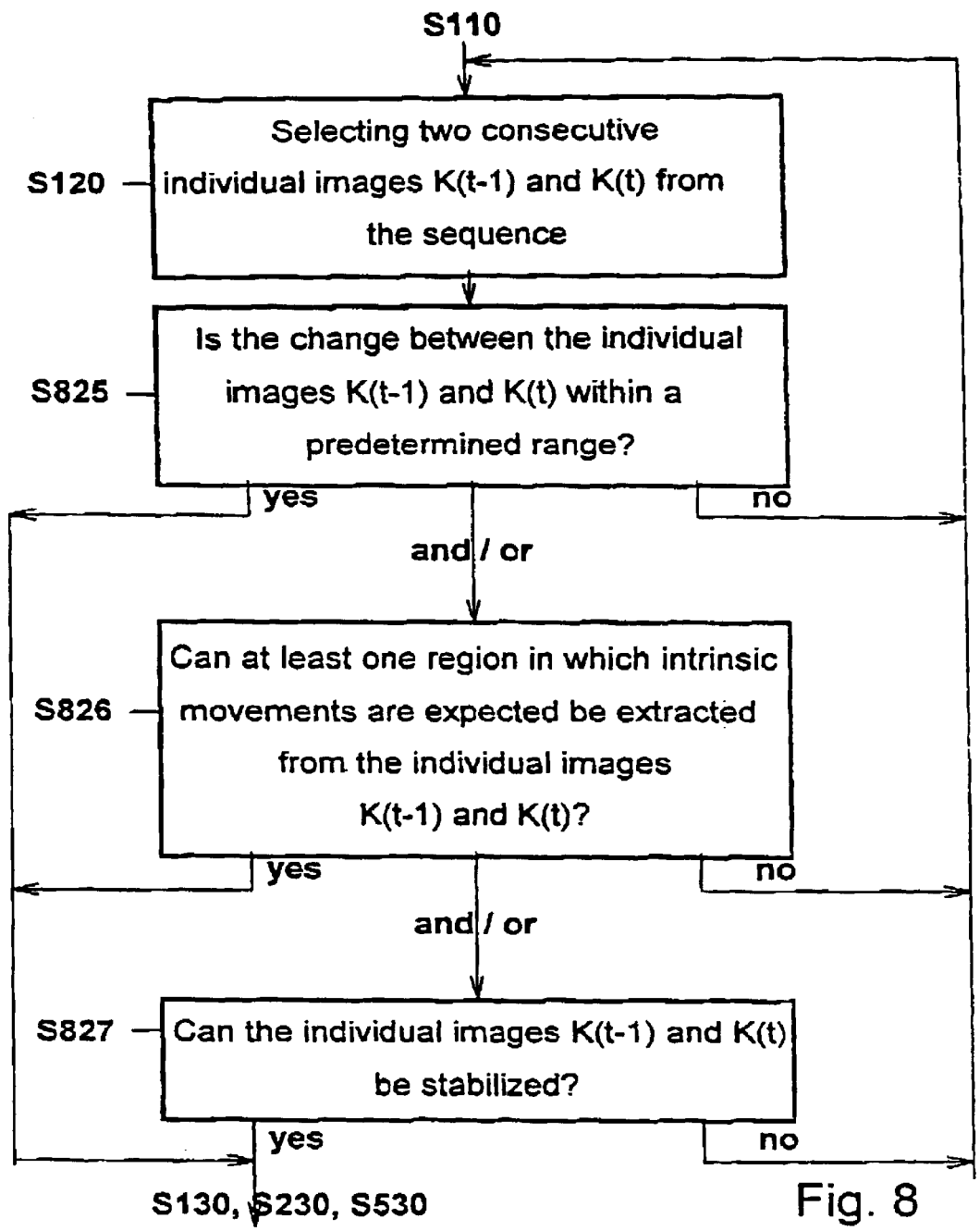
FIG. 8 is a sequence diagram of a seventh embodiment of the method for verifying the authenticity according to the present invention.

FIG. 8 shows a sequence diagram of an eighth embodiment of the method according to the invention. The steps of the eighth embodiment serve to optimize the individual images after recording for determining the intrinsic movements.

Thus, as shown in FIG. 8, two consecutive individual images are chosen in step S120 after a sequence of consecutive individual images has been recorded in step S110.

In step S825, it is first of all checked whether or not the change between the two consecutive individual images is within a predetermined range.

Since the change between two consecutive individual images must be greater than a predetermined value, it is ensured that in both individual images a change going beyond normal noise has taken place and thus an actual movement or an intrinsic movement of the person to be identified.

On the other hand, since the change between two consecutive individual images must be smaller than a predetermined value, it is ensured that differential images in which an excessively strong movement is reflected, as is e.g. caused by shaking the recording means or by an extremely fast movement of the person to be identified, are not used for determining the intrinsic movement because in such a case a distinction between an actual movement and an intrinsic movement can no longer be made in a sufficiently reliable manner.

Step S825 can be carried out in that a motional intensity is calculated for determining the change between two consecutive individual images.

In case the differential images are gray-level images, the motional intensity can substantially be calculated through the sum of the gray level of the differential image. In case the differential image is binarized, the motional intensity is expediently calculated through the sum of the 1 pixel or 0 pixel of the binarized differential image.

In step S826, which can be carried out alternatively or cumulatively with respect to step S825, the regions in the individual images in which intrinsic movements are expected are extracted from the corresponding individual images before the individual images are compared with each other. The amount of data to be processed can thus be reduced considerably.

A region which can expediently be extracted because a multitude of intrinsic movements take place therein is the head region.

Thus for extracting purposes a predetermined section in the individual images where according to experience the head of the person to be identified comes to rest can be extracted.

Figure 9:
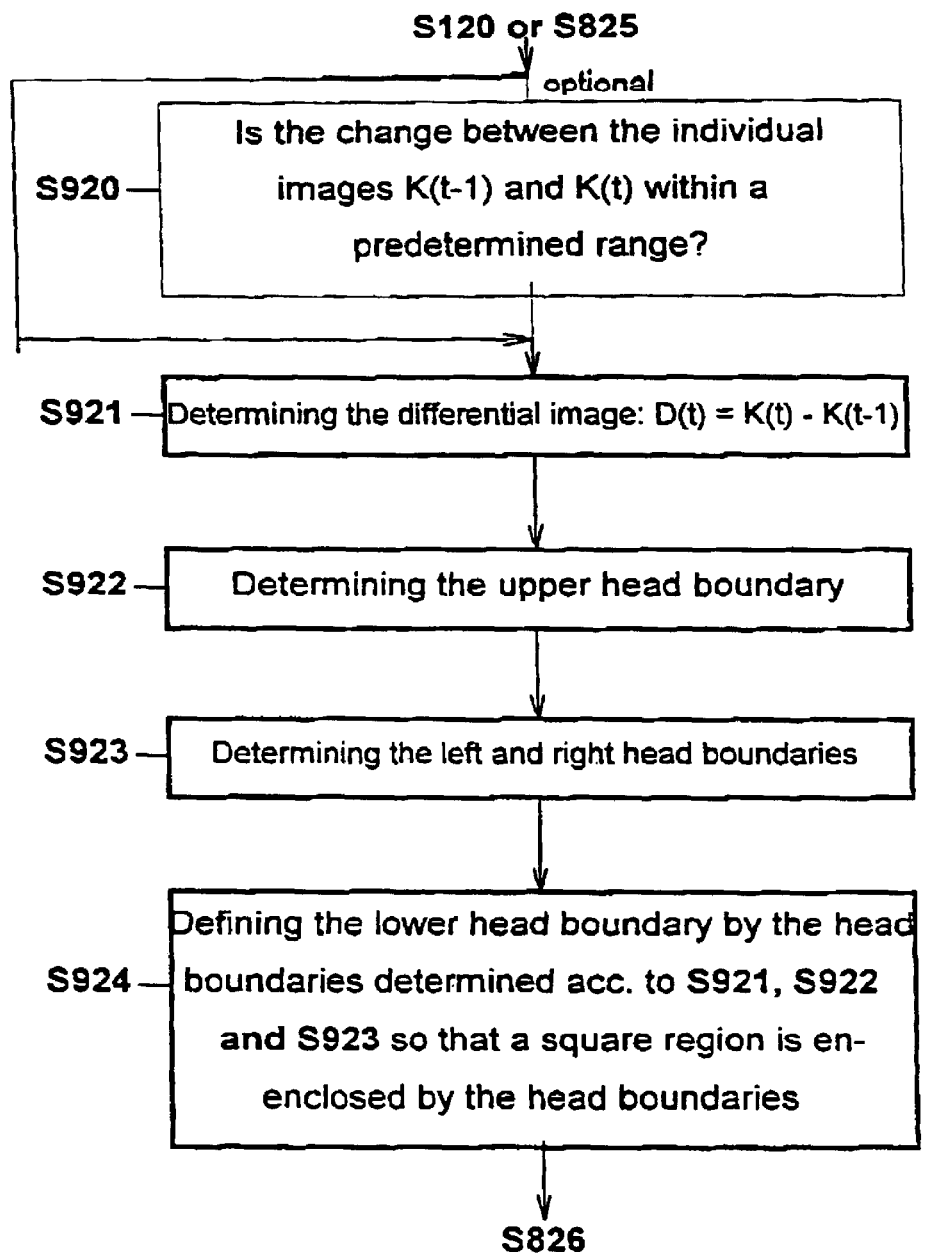
FIG. 9 is a sequence diagram of an eighth embodiment of the method for verifying the authenticity according to the present invention.

With reference to FIG. 9. an alternative to said method shall be described below. According to said alternative the head region of the person to be identified is determined by determining the head boundaries from a differential image. With said determined head boundaries the head region can then finally be extracted from the respective individual images.

Again alternatively or cumulatively with respect to steps S826 and S825, respectively, the individual images can be stabilized in step S827.

Again alternatively or cumulatively with respect to steps S826 and/or step 825, two or more individual images can be stabilized with respect to each other in step 827 or, in other words, aligned with respect to each other.

To this end a residual shift (l,m) between K(t) and K(t−1) can be determined by template matching. For this purpose K(t) and K(t−1) are first superimposed in centered fashion (this is equal to a residual shift (l,m)=(0,0)). The standardized correlation c(0,0) is then determined. In the next step the standardized correlations c(l,m) are calculated in dependence upon a variation of the residual shift in the vicinity of (l,m)=(0,0).

The correlation correction (x,y) finally follows from $$(x, y) = \underset{(x,y)}{\mathrm{argmax}}\, c(x, y). \quad (11)$$

With this residual correction a stabilized differential image D(t) can finally be determined according to $$D_{cr}(t) = K_{c-x,r-y}(t-1) - K_{cr}(t) \quad (12)$$

FIG. 9 is a sequence diagram of the already above-mentioned alternative for determining the head boundaries with the help of which the head region in which most of the intrinsic movements are expected can be extracted from individual images K(t−1) and K(t).

Starting from two selected consecutive individual images K(t−1) and K(t), the differential image D(t) is first determined in step S921.

In step S922, the upper head boundary is then determined from the differential image D(t). To this end the horizontal projection $s_H(t)$ is first determined according to $$s_H(t) = \sum_c D_{cr}(t) \quad (13)$$

In this context it should be remembered that c designates the columns and r the lines of the differential image.

Optionally, function $s_H(t)$ can be smoothed by filtering with a suitable low-pass filter TPF.

The absolute value of the first derivative is then formed from the function $s_H(t)$ or the smoothed function $TPF\{s_H(t)\}$, respectively $$b_H(t)=|s_{r+1}(t)-s_{r-1}(t)| \qquad (14)$$

The position of the first maximum of $b_H$ that is greater than a predetermined threshold value, here half the mean of $b_H$, is now determined as the upper head boundary.

If such a value is not found, the calculation of the upper head boundary can be repeated or set to a predetermined value which has e.g. been determined for the individual images $K(t-2)$ and $K(t-1)$.

Finally, in step S293 the left and right head boundaries are determined. To this end the differential image can be divided into q successive strips which extend in vertical direction downwards, starting from the upper head boundary t.

In each strip the vertical projection of the differential image is then calculated according to $$s_V^{(q)}(t) = \sum_{r=t+qz}^{1+(q+t)z-1} D_{cr}(t) \qquad (15)$$

As in the case where the upper head boundary has been calculated, the function $s_V^{(q)}(t)$ can be smoothed by filtering with a suitable low-pass filter TPF.

In the next step the absolute value of the first derivative of the function $s_V^{(q)}(t)$ and the smoothed function $TPF\{s_V^{(q)}(t)\}$ is formed and subsequently summed over q:

$$b_V(t) = \sum_q |s_{c+1}^{(q)}(t) - s_{c-1}^{(q)}(t)| \qquad (16)$$

Of this function $b_V$ all maxima are determined that are greater than a predetermined threshold value, here half the mean $b_V$.

The first maximum (the maximum farthest to the left) is defined as the position of the left head boundary. The last maximum (the maximum farthest to the right) is defined as the right head boundary.

If function $b_V$ has less than two of such maxima, the determination of the left and right head boundaries for the next following differential image can be carried out. Alternatively, the left and right head boundaries can be replaced by predetermined values which have e.g. followed from the determination of the head boundary with the help of the differential image $D(t-1)$.

Finally, in step S924, the lower head boundary is determined with the help of the upper, left and right head boundaries. To this end the width of the extracted region is determined from the difference between the right head boundary and the left one. The lower head boundary can be adjusted such that a square region is obtained on the whole.

Apart from the variant described in FIG. 9 for determining the head boundaries, alternative embodiments are possible.

For instance, it is possible to determine only the upper and left head boundaries according to the above-described procedures. The lower and right head boundaries can then be calculated by way of a predetermined width and a predetermined height, which typically correspond to the head region in the individual images.

Moreover, the head boundaries can also be determined from a differential image which has been obtained as an AND operation from two consecutive differential images.

Furthermore, it can optionally be checked in the embodiment shown in FIG. 9 whether the change between the individual images $K(t-1)$ and $K(t)$ is within a predetermined range.

Since the same procedures as explained in connection with step S825 can be used for this purpose, a description is here not needed, and reference is just made to the description regarding step S825.

What is claimed is:

1. A method for verifying the authenticity of an image recorded in a person identifying process and belonging to a person to be identified, the method comprising the steps of:
   recording a sequence of consecutive individual images of the person, and
   determining the authenticity of the recorded image if in at least two consecutive individual images of the sequence intrinsic movements are detected.

2. The method according to claim 1, wherein determination of the intrinsic movements comprises evaluating at least one differential image of two consecutive individual images of the sequence.

3. The method according to claim 2, wherein for the determination of the intrinsic movements a differential image is evaluated that results from an AND operation of two consecutive differential images.

4. The method according to claim 2, wherein each differential image is binarized prior to evaluation.

5. The method according to claim 4, wherein binarization is carried out by means of a threshold value which is determined by evaluating the background.

6. The method according to claim 2, wherein in each differential image at least one section of enhanced movement is selected, and intrinsic movements are detected if said at least one section in the differential image is consistent with a predetermined region in which intrinsic movements are to be expected.

7. The method according to claim 6, wherein the section of enhanced movement has a vertical and a horizontal extent,
   wherein the vertical extent is substantially determined by a peak of a function of the products from the horizontal projections with the horizontal variances of the differential image, and
   the horizontal extent is substantially determined by a peak of the function of the products from the vertical projections with the vertical variances of the differential image.

8. The method according to claim 7, wherein each function is smoothed with a low-pass filter prior to the determination of the corresponding peak.

9. The method according to claim 6, wherein sections are chosen from the differential image that are expected to have a symmetrical relationship with one another, and
   intrinsic movements are detected when the symmetrical relationship is verified by a correlation analysis of the corresponding sections.

10. The method according to claim 6, wherein intrinsic movements are detected if it is determined by way of a correlation analysis that the enhanced movement in the region of enhanced movement is irregularly distributed over said region.

11. The method according to claim 2, wherein detection of intrinsic movements further comprises evaluating:
    a function which depends on the vertical position and which is determined for a given vertical position through the product from the horizontal projection with the horizontal variance of the differential image, and
    a function which depends on the horizontal position and which is determined for a given horizontal position through the product from the vertical projection with the vertical variance of the differential image.

12. The method according to claim 11, wherein each function is smoothed with a low-pass filter.

13. The method according to claim 12, wherein two consecutive individual images are only used for determining the intrinsic movements if a change between the two consecutive individual images is within a predetermined range.

14. The method according to claim 13, wherein a motional intensity is calculated for determining the change between two consecutive individual images.

15. The method according to claim 14, wherein the motional intensity is substantially calculated through a sum of the gray level of the different image.

16. The method according to claim 14, wherein the motional intensity is substantially calculated through the sum of the 1 pixel or 0 pixel of a binarized differential image.

17. The method according to claim 11, wherein
at least one peak is determined in the function depending on the vertical position, and at least one peak is determined in the function depending on the horizontal position, and
intrinsic movements are detected if said peaks in the vertical and horizontal direction are within predetermined limits that are given by the vertical and horizontal extent of at least one region in which intrinsic movements are to be expected.

18. The method according to claim 11 further comprising evaluating,
on the basis of the function depending on at least one of the vertical position and the function depending on the horizontal position, sections that are expected to be in a symmetrical relationship, and
detecting intrinsic movements if the symmetrical relationship is verified by a correlation analysis of the corresponding sections.

19. The method according to claim 18, wherein the sections which are expected to be in a symmetrical relationship are standardized with respect to each other prior to the correlation analysis.

20. The method according to claim 11 further comprising evaluating at least one of
the function depending on the vertical position and the function depending on the horizontal position, and
detecting intrinsic movements if it is determined by way of a correlation analysis that the values of at least one of the function depending on the vertical position and of the function depending on the horizontal position are irregular over a predetermined region.

21. The method according to claim 1, wherein the intrinsic movements to be determined are intrinsic movements in the head region of the person to be identified.

22. The method according to claim 21, wherein the intrinsic movements to be determined are intrinsic movements in at least one of the group consisting of the mouth region, the cheek region, the nose region, and the eye region of the person to be identified.

23. The method according to claim 21, wherein the intrinsic movements to be determined are intrinsic movements in at least two regions that are in symmetrical relationship with each other in the head region of the person to be identified, and said at least two symmetrical regions are used for determining the axis of symmetry of the head region.

24. The method according to claim 23, further comprising producing with the help of the axis of symmetry found, an image which can be used for identifying a person and in which a frontoparallel-rotated head region is transformed into a head region with a rotated axis of symmetry.

25. The method according to claim 23, further comprising producing an image of the person to be identified with the help of the axis of symmetry found, said image being useable for identifying the person and being composed of the left head region and the mirrored left head region or of the right head region and the mirrored right head region.

26. The method according to claim 1, further comprising prior to the detection of the authenticity extracting regions from the individual images in which intrinsic movements are expected.

27. The method according to claim 26, wherein extracting the regions comprises evaluating at least one differential image of two consecutive individual images of the sequence.

28. The method according to claim 27, wherein extracting the regions comprises evaluating a differential image that results from an AND operation of two consecutive differential images.

29. The method according to claim 27, wherein each differential image is binarized prior to evaluation.

30. The method according to claim 29, wherein binarization is carried out by means of a threshold value which is determined by evaluating the background.

31. The method according to claim 26, wherein the head region of the person to be identified is extracted.

32. The method according to claim 31, wherein the extracted head region for identifying the person is transformed to a predetermined standard size.

33. The method according to claim 31, wherein extracting the head region comprises determining at least two head boundaries in the corresponding individual images, on the basis of which the head region is extracted from the corresponding individual images.

34. The method according to claim 33, wherein determining the head region in the corresponding individual images comprises determining the upper and the left head boundary.

35. The method according to claim 34, wherein for the determination of the upper head boundary comprises:
determining a function of the vertical projections of a binarized differential image, and
defining the upper head boundary by the first maximum of the absolute value of the first derivative of said function that is above a predetermined threshold value.

36. The method according to claim 35, wherein the function of the vertical projections is smoothed with a low-pass filter prior to defining the head boundary.

37. The method according to claim 34, wherein determination of the left head boundary comprises:
determining a function of the horizontal projections of a binarized differential image, and
defining the left head boundary by the first maximum of the absolute value of the first derivative of said function that is above a predetermined threshold value.

38. The method according to claim 37, wherein the function or functions of the horizontal projections is/are smoothed with a low-pass filter prior to defining the head boundary.

39. The method according to claim 34, wherein determination of the left head boundary comprises:
dividing a binarized differential image into a plurality of vertically successive strips, the first strip being vertically downwardly adjacent to the upper head boundary determined,
determining in each strip the function of the horizontal projections of the binarized differential image, forming the absolute values of the first derivatives of the resulting plurality of functions of the horizontal projections, adding the sum of the resulting plurality of absolute values, and defining the left head boundary as the first maximum of said sum that is above a predetermined threshold value.

40. The method according to claim 34, wherein determination of the right head boundary comprises:

determining a function of the horizontal projections of a binarized differential image, and defining the right head boundary by the last maximum of the absolute amount of the first derivative of said function that is above a predetermined threshold value.

41. The method according to claim 40, wherein the function or functions of the horizontal projections is/are smoothed with a low-pass filter prior to defining the head boundary.

42. The method according to claim 34, wherein determination of the right head boundary comprises:

dividing a binarized the differential image into a plurality of vertically successive strips, the first strip being vertically downwardly adjacent to the upper head boundary determined, determining in each strip the function of the horizontal projections of the binarized differential images, forming the absolute values of the first derivatives of the resulting plurality of functions of the horizontal projections, adding the sum of the resulting plurality of absolute values, and defining the right head boundary as the last maximum of said sum that is above a predetermined threshold value.

43. The method according to claim 34, wherein one of the lower and the right head boundary is defined such that a square head region is extracted from at lest one of the corresponding individual images and differential images.

44. The method according to claim 33, wherein determining the head boundary in the corresponding individual images comprises determining the upper, the left and the right head boundary.

45. The method according to claim 33, wherein each head boundary is defined by a head boundary line which extends such that the contour of the head is positioned substantially entirely within the head boundary lines.

46. The method according to claim 33, wherein two consecutive individual images are only used for determining the head boundaries if a change between the two consecutive individual images is within a predetermined range.

47. The method according to claim 46, wherein determination of the change between two consecutive individual images includes calculating a motional intensity.

48. The method according to claim 47, wherein the motional intensity is substantially calculated through a sum of the gray level of a differential image obtained from the two consecutive individual images.

49. The method according to claim 47, wherein the motional intensity is substantially calculated through the sum of the 1 pixel or 0 pixel of a binarized differential image.

50. The method according to claim 33, wherein predetermined head boundaries are used for extracting the head region if no head boundaries can be determined.

51. The method according to claim 33, wherein predetermined head boundaries are used for extracting the head region if one of the head boundaries determined is not within predetermined limits.

52. The method according to claim 1, wherein a stabilized differential image is formed from two consecutive individual images, said image being evaluated for one of detecting the intrinsic movements and extracting the regions in which intrinsic movements are to be detected.

53. The method according to claim 52, wherein stabilization is carried out by means of a correlation correction.

54. The method according to claim 53, wherein the correlation correction comprises template matching.

55. The method according to claim 54, wherein template matching comprises calculating a differential image, the first individual image used for forming the differential image being shifted in the calculation of the differential image with respect to the second individual image used for forming the differential image in such a manner that a correlation function between the two individual images is maximum.

* * * * *